United States Patent
Umebayashi (10) Patent No.: US 6,923,497 B2
(45) Date of Patent: Aug. 2, 2005

(54) CEILING AIR PASSAGE SYSTEM FOR VEHICLE AIR CONDITIONER

(75) Inventor: Makoto Umebayashi, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/690,151

(22) Filed: Oct. 21, 2003

(65) Prior Publication Data

US 2004/0084936 A1 May 6, 2004

(30) Foreign Application Priority Data

Oct. 30, 2002 (JP) ........................................ 2002-315916

(51) Int. Cl.$^7$ ................................................ B60N 2/00
(52) U.S. Cl. ........................................ 296/208; 165/41
(58) Field of Search .......................... 296/208; 62/244; 165/41, 42, 43; 280/782

(56) References Cited

U.S. PATENT DOCUMENTS

| 4,679,616 | A | * | 7/1987 | Ferdows et al. ............... | 165/43 |
| 4,888,959 | A | * | 12/1989 | Brown ......................... | 62/244 |
| 5,001,905 | A | * | 3/1991 | Miyazaki ..................... | 62/244 |
| 5,054,378 | A | * | 10/1991 | Speece ........................ | 62/244 |
| 5,307,645 | A | * | 5/1994 | Pannell ........................ | 62/244 |
| 5,862,674 | A | * | 1/1999 | Ichishi et al. ................ | 62/244 |
| 6,120,370 | A | * | 9/2000 | Asou et al. ................... | 62/244 |
| 6,397,942 | B1 | * | 6/2002 | Ito et al. ..................... | 62/244 |
| 2004/0031602 | A1 | * | 2/2004 | Sugiura ....................... | 62/244 |

FOREIGN PATENT DOCUMENTS

JP        62-3310        1/1987

* cited by examiner

Primary Examiner—Lori L. Coletta
(74) Attorney, Agent, or Firm—Harness, Dickey & Pierce, PLC (57) ABSTRACT

A ceiling air passage system for a vehicle air conditioner has an air passage into which conditioned air from an air conditioning unit is introduced, a three-dimension structure member having a three-dimension passage shape. The air passage is provided along a vehicle ceiling portion, and the three-dimension structure member is disposed substantially in an entire area of the air passage. Further, a passage member for defining a lower part of the air passage is provided with innumerable air outlets from which conditioned air in the air passage is blown downward in the passenger compartment. Accordingly, the conditioned air can be relatively uniformly blown in a wide area of the vehicle ceiling portion.

19 Claims, 8 Drawing Sheets

CEILING AIR PASSAGE SYSTEM FOR VEHICLE AIR CONDITIONER

CROSS-REFERENCE TO RELATED APPLICATION

This application is related to and claims priority from Japanese Patent Application No. 2002-315916 filed on Oct. 30, 2002, the content of which is hereby incorporated by reference.

BACKGROUND OF THE INVENTION

1. Field of the Invention

The present invention relates to a ceiling air passage system for vehicle air-conditioning. The ceiling air passage system includes three-dimension passage structure, and innumerable ceiling air outlets from which conditioned air is blown downward in a passenger compartment.

2. Description of Related Art

For example, in JP-U-62-3310, a ceiling air passage system for a vehicle air conditioner includes a large number of ceiling air outlets from which conditioned air is blown downward in a passenger compartment. Specifically, an upper plate is disposed at a lower side of a vehicle roof, and a lower plate is disposed at a lower side of the upper plate while a predetermined clearance is provided therebetween. A bag-shaped air passage is provided between the upper and lower plates, and the ceiling air outlets are provided in an entire surface of the lower plate or in a part surface of the lower plate. In this way, conditioned air (cool air) from an air conditioning unit is blown into the bag-shaped air passage through an air duct. Then, the conditioned air in the bag-shaped air passage is blown downward in the passenger compartment from the ceiling air outlets provided in the lower plate.

However, in this ceiling air passage system, the bag-shaped air passage is provided to simply extend in the entire back surface (lower surface) of the vehicle roof. Therefore, when the conditioned air is blown into the bag-shaped air passage from the air duct, the conditioned air flowing in the bag-shaped air passage deflects in a direction due to the dynamic pressure of the blown air. As a result, the conditioned air cannot be blown uniformly from an entire area of the bag-shaped air passage.

SUMMARY OF THE INVENTION

In view of the above problem, it is a first object of the present invention to provide a ceiling air passage system for a vehicle air conditioner, which is capable of blowing conditioned air uniformly from a vehicle ceiling portion.

It is a second object of the present invention to suitably provide both of a ceiling opening function using a rectangular sunroof opening and a ceiling air blowing function in a vehicle having the sunroof opening.

According to the present invention, a ceiling air passage system for a vehicle air conditioner having an air conditioning unit includes a passage member for defining an air passage into which conditioned air from the air conditioning unit is introduced, a three-dimension structure member having a three-dimensional passage shape. In the ceiling air passage system, the air passage is provided along a surface of a vehicle ceiling portion, the three-dimension structure member is disposed in the air passage, and the passage member for defining a lower part of the air passage is provided with innumerable air outlets from which the conditioned air in the air passage is blown downward in the passenger compartment. Accordingly, the conditioned air, introduced into the air passage, is distributed in various directions while passing through three-dimension fine passages of the three-dimension structure member. Therefore, the conditioned air can be blown from the innumerable air outlets at a relatively uniform speed in a wide area where the air passage is provided. As a result, relatively uniform air-conditioning feeling can be given to the upper half body of each passenger on the passenger seats in the passenger compartment.

The ceiling air passage system can be effectively used for a vehicle having a rectangular sunroof opening. In this case, for example, the air passage is provided to enclose an entire periphery of the rectangular sunroof opening of the vehicle. Alternatively, the air passage is provided to enclose three edges of the rectangular sunroof opening. Alternatively, the air passage is provided at a vehicle rear side of the rectangular sunroof opening. Accordingly, the ceiling opening function using the sunroof opening can be exhibited while the air passage can be provided. Further, because the air passage can be provided in a substantially entire area of the ceiling portion except for the sunroof opening, the air outlets can be provided in a wide area of the vehicle ceiling portion. Therefore, conditioned air from the air conditioning unit can be blown from the air outlets by a very small air-blowing speed, and uncomfortable wind feeling is not given to a passenger. Thus, mild and comfortable air-conditioning feeling can be given to the upper half body of the passenger on each passenger seat.

Preferably, a partition member is provided for partitioning the air passage into a first passage area and a second passage area in a vehicle right-left direction or in a vehicle front rear direction, and the first passage area and the second passage area are connected to the air conditioning unit such that the conditioned air from the air conditioning unit is independently blown into the first and second passage areas of the air passage. In this case, an air temperature or an air amount to be blown to an area of the passenger compartment from the air outlets of the first passage area can be independently controlled from an air temperature or an air amount to be blown to an another side of the passenger compartment from the air outlets of the second passage area. Specifically, the air conditioning unit includes at least an electric blower for blowing air, a heat exchanger for performing a heat exchange of air blown by the electric blower, and an independent temperature adjusting mechanism for independently adjusting temperature of air to be blown from the air conditioning unit into the first passage area and temperature of air blown from the air conditioning unit into the second passage area, and the air passage is provided such that the temperature of air blown from the air outlets in the first passage area and the temperature of air blown from the air outlets in the second passage area are independently adjusted.

Preferably, the passage member for defining the air passage includes a heat insulating member disposed at a back side of a vehicle roof, and a ceiling base member disposed at a lower side of the heat insulating member to have a predetermined distance between the heat insulating member and the ceiling base member. Further, the air passage is provided in a flat space between the heat insulating member and the ceiling base member, the three-dimension structure member is arranged substantially in an entire area of the flat space and is constructed with a net structure of a fiber member made of a synthetic resin, and the innumerable air outlets are provided substantially in an entire area of the ceiling base member. Accordingly, uniform air-conditioning feeling can be given to a passenger in the passenger compartment through the ceiling air passage system. In the present invention, for example, the three-dimension structure member is fixed to the ceiling base member by using one of an adhesive and a mechanical fixing member.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

(First Embodiment)

Figure 1:
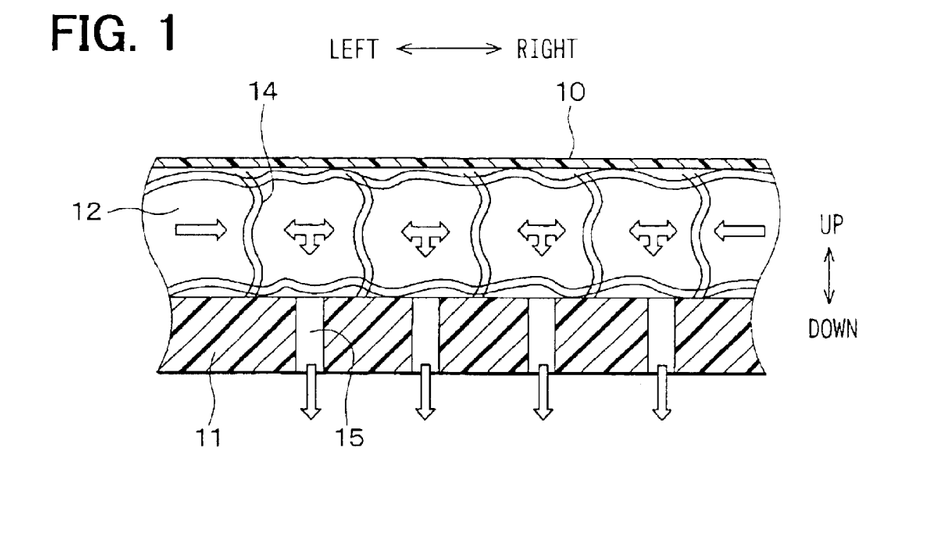
FIG. 1 is a cross-sectional view showing a part of a ceiling air passage system for a vehicle air conditioner according to a first embodiment of the present invention.
Figure 2:
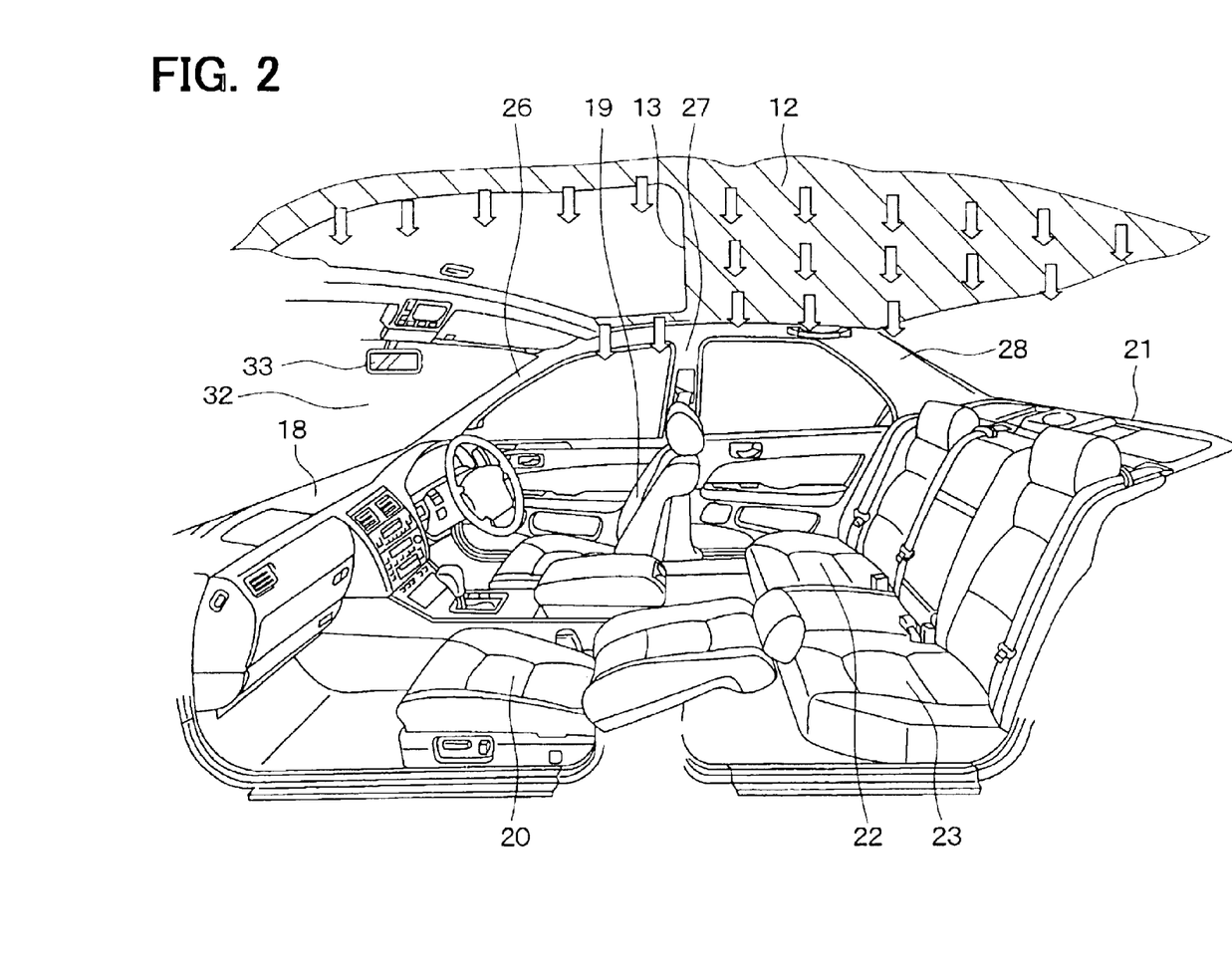
FIG. 2 is a perspective view showing a passenger compartment of a vehicle for which the ceiling air passage system according to the first embodiment is used.

The first embodiment of the present invention will be now described with reference to FIGS. 1–4. As shown in FIG. 1, a ceiling portion of a vehicle includes a heat insulating member 10 disposed at a lower side (back side) of a vehicle roof (not shown). The heat insulating member 10 is a sheet made of a resin material having high heat-insulating performance and high sealing performance. A ceiling base member 11 is disposed at a lower side of the heat insulating member 10 to have a predetermined distance therebetween. The ceiling base member 11 is made of a resin, and has a thickness much thicker than a thickness of the heat insulating member 10. A base plate of the ceiling portion in a passenger compartment shown in FIG. 2 is constructed with the ceiling base member 11. The predetermined distance is provided between the heat insulating member 10 at the upper side and the ceiling base member 11 at the lower side, thereby providing an air passage 12 between the heat insulating member 10 and the ceiling base material 11. The air passage 12 through which conditioned air flows is a flat shape passage provided in a wide area of the ceiling portion. In the first embodiment, the present invention is applied to a vehicle having a sunroof opening 13 shown in FIG. 3. The sunroof opening 13 has a rectangular shape having a longer edge in a vehicle right-left direction, and is provided at a vehicle front side from a center of the ceiling portion in a vehicle front-rear direction.

Figure 3:
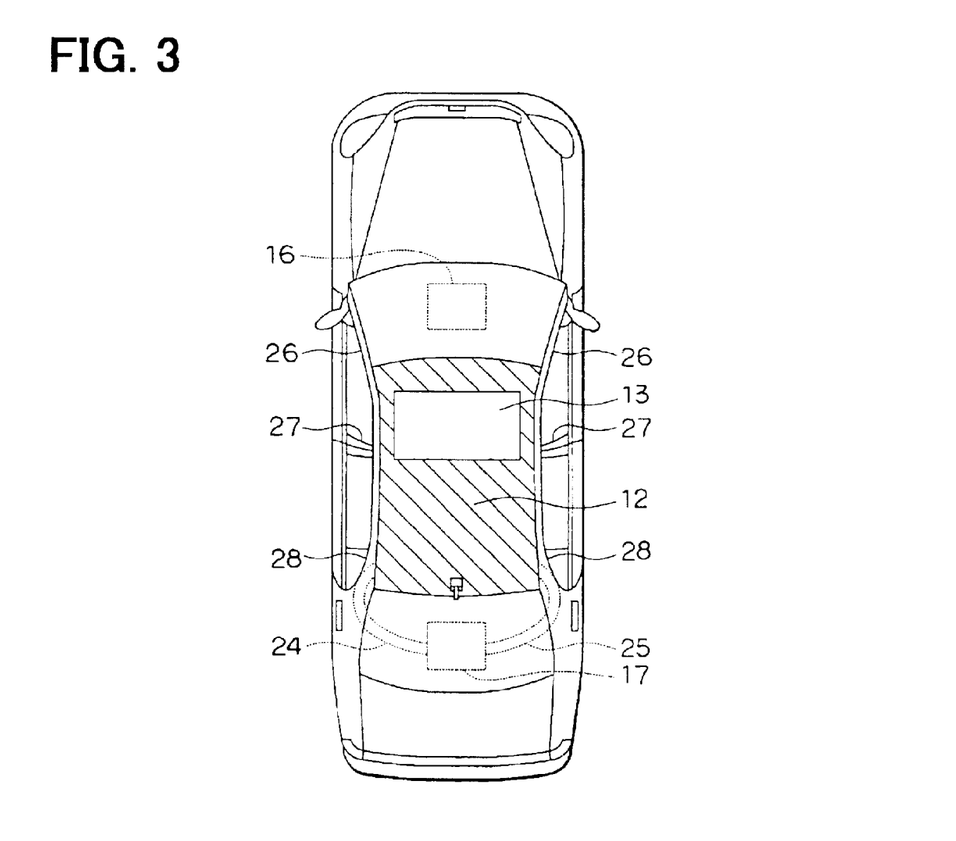
FIG. 3 is a schematic top view showing a vehicle for which the ceiling air passage system according to the first embodiment is used.

As indicated by a slant line area in FIG. 3, the air passage 12 is provided so as to enclose an entire periphery of the sunroof opening 13. A three-dimension air passing structure 14 (three-dimension structure member) having therein three-dimension fine passage shape is formed substantially in an entire area of the air passage 12. Specifically, the three-dimension air passing structure 14 is constructed with a net structure of resinous fibers, and is fixed to the ceiling base member 11 by using an adhesive or a mechanical fixing member. Alternatively, the three-dimension air passing structure 14 can be sandwiched between the heat insulating member 10 and the ceiling base member 11 to be fixed therebetween. A peripheral portion (end portion) of the heat insulating member 10 is air-tightly adhered to the ceiling base member 11 while the three-dimension air passing structure 14 is provided between the heat insulating sheet 10 and the ceiling base material 11, thereby sealing the peripheral portion of the air passage 12. The ceiling base member 11 has innumerable air outlets 15 (i.e., large number of air outlets) in the entire area of the air passage 12, so that conditioned air is blown from the air outlets 15 downward in the passenger compartment. The slant line area in FIGS. 2, 3 and 5–12 shows the arrangement areas of the air passage 12, while not shown in these figures, the large number of air outlets 15, illustrated in FIG. 1, are arranged throughout the slant line areas of these figures.

As shown in FIG. 3, a front air conditioning unit 16 and a rear air conditioning unit 17 are disposed in the vehicle as interior air conditioning units of the vehicle air conditioner. The front air conditioning unit 16, for performing air-conditioning of an area of front passenger's seats 19, 20, is disposed in an inner space of a dashboard 18. The rear air-conditioning 17, for performing air-conditioning of an area of rear passenger's seats 22, 23, is disposed below a rear tray 21. Each of the front and rear air conditioning units 16, 17 includes an electric blower, a cooling heat exchanger for cooling air blown by the electric blower, a heating heat exchanger for heating the blown air, a temperature adjusting mechanism for adjusting a temperature of the air to be blown into the passenger compartment, an air-outlet mode switching mechanism and the like. Therefore, each of the front and rear air conditioning units 16, 17 can independently exhibit a temperature adjusting function of the blown air, a switching function of an air outlet mode, an adjustment function of an air blowing amount of the blower and the like.

In the first embodiment, right and left air ducts 25, 24 are connected to an air outlet portion of the rear air conditioning unit 17. The right and left air ducts 25, 24 are disposed to extend upward to the ceiling portion at positions corresponding to C pillars 28 that are located at the most rear side among A pillars 26, B pillars 27 and the C pillars 28. The downstream ends (top ends) of the right and left air ducts 25, 24 are connected to the ceiling portion at right and left ends of the air passage 12 on vehicle rear side, respectively. The downstream ends of the right and left air ducts 25, 24 are air-tightly connected to the air passage 12 by using the sealing performance of the heat insulating member 10.

Next, operation of the first embodiment will be described. When the rear air conditioning unit 17 is operated, and a communicating state between the air outlet portion of the rear air conditioning unit 17 and the air ducts 25, 24 is set by an air-outlet mode switching mechanism of the rear air conditioning unit 17, conditioned air, which is temperature-adjusted by the rear air conditioning unit 17, can be blown into the air passage 12 through the air ducts 25, 24.

Here, the three-dimension air passing structure 14 having the three-dimension fine passages is disposed substantially in the entire area of the air passage 12. Therefore, the conditioned air, blown into the air passage 12 from the downstream ends of the air ducts 25, 24, is distributed in various directions while passing through the three-dimension fine passages of the three-dimension air passing structure 14. As a result, the conditioned air can be blown from the air outlets 15 by a relatively uniform speed in the wide area (slant line area in FIG. 3) where the air passage 12 is provided. In this way, relatively uniform air-conditioning feeling can be given to the upper half body of passengers on the passenger seats 19, 20, 22, 23 in the passenger compartment. Further, the air passage 12 is disposed in the ceiling portion, and the conditioned air in the air passage 12 is blown from the air outlets 15 toward the head portion of the passenger. Therefore, the air passage 12 of the ceiling portion is used mainly in a cooling operation where an air temperature to be blown into the passenger compartment is adjusted by the rear air conditioning unit 17 to a low temperature.

Figure 4:
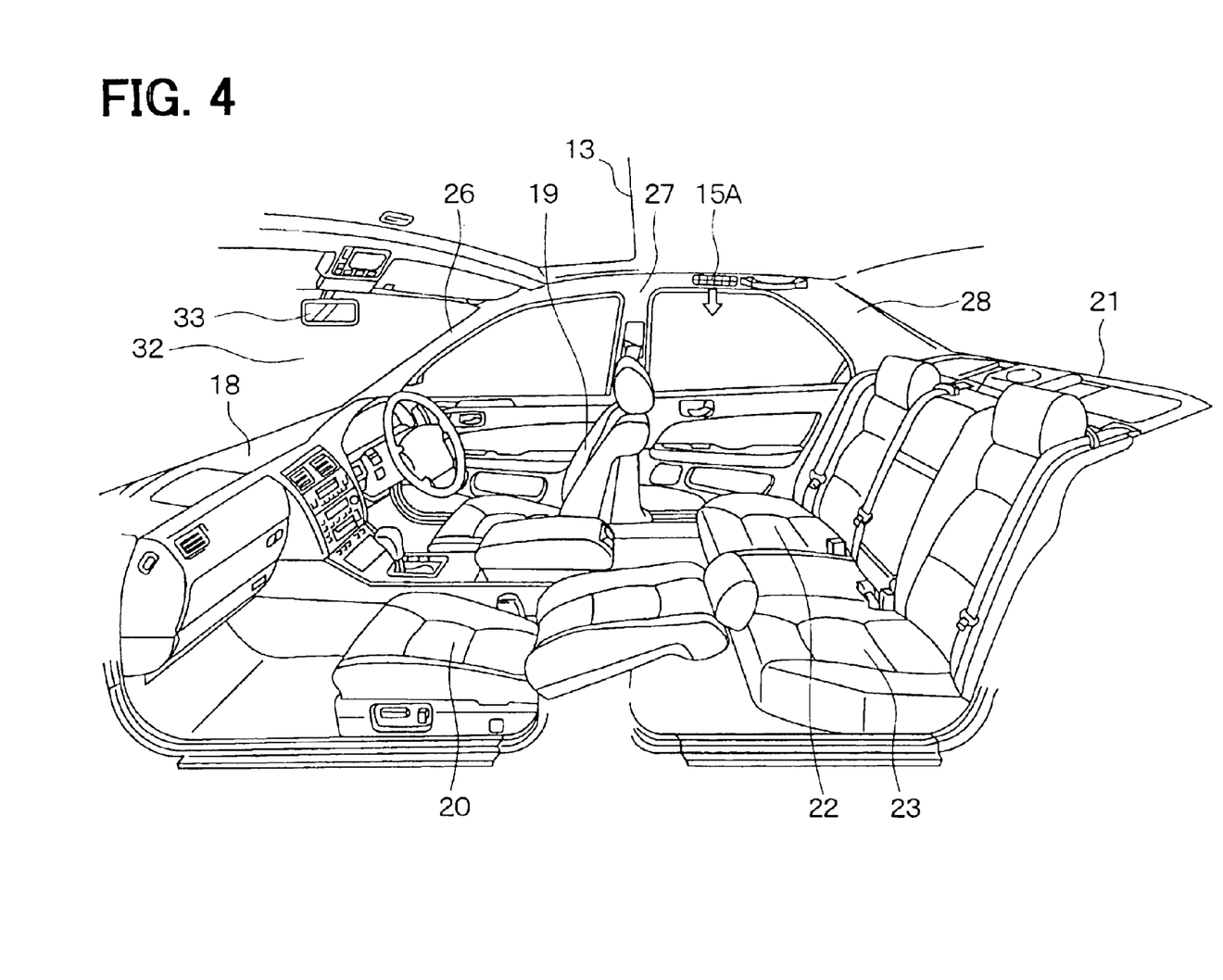
FIG. 4 a perspective view showing a passenger compartment of a vehicle for which a ceiling air passage system in a comparison example of the present invention is used.

FIG. 4 shows a comparison example of the present invention, in which a ceiling air outlet 15A is disposed partially above a side window in spot. In this case, relatively high-speed conditioned air is partially blown from the ceiling air outlet 15A to the head portion of the passenger, so that wind feeling of the conditioned air (cold air) is given to the head portion of the passenger. As a result, uncomfortable wind feeling is given to the passenger, thereby worsening air-conditioning feeling. On the other hand, in the first embodiment of the present invention, the air passage 12 is provided approximately in an entire area of the ceiling portion except for the sunroof opening 13, and the many air outlets 15 are provided in the bottom surface portion for defining the air passage 12. Therefore, the conditioned air is blown by a uniform and very small speed from the wide area of the ceiling portion, and air-conditioning can be performed for the upper half body of the passenger so as to cover the upper half body. Accordingly, uncomfortable wind feeling is not given to the passenger, and mild and comfortable air-conditioning feeling can be given to the passenger.

In the first embodiment, the present invention is applied to the vehicle having the rectangular sunroof opening 13, and the air passage (slant line area in FIG. 3) 12 is provided to enclose the entire periphery of the sunroof opening 13. Therefore, the mild and comfortable ceiling air-blowing function can be obtained while the ceiling opening function using the sunroof opening 13 is ensured.

Next, specific design examples of the air passage 12 and the air outlet 15 will be described. Generally, the area where the air passage 12 is provided, that is, the area where the air outlets 15 are provided is set as follows to ensure comfortable cooling feeling. Specifically, the area is set so as to cover at least a half or more of the upper half body of each of the right and left passengers in the vehicle right-left direction, and a half or more of the upper half body of the passenger also on the rear seat in the vehicle front-rear direction. When the air outlet 15 has a circular hole, a hole diameter ø of the air outlet 15 is set at 1 mm to 10 mm, and an area of each hole is set in a range of 0.78–78 mm$^2$. An opening ratio of the air outlets 15, that is, a ratio of a total opening area of all the air outlets 15 to a total area where the air passage 12 is provided is set at 4% or more. An air passing degree in the air outlet 15 is set to be equal to or larger than 100 milliliter (mL)/(cm$^2$·sec.), preferably, to be equal to or larger than 140 mL/(cm$^2$·sec.). When the air passage 12 and the air outlets 15 are designed in this way, uncomfortable wind feeling is prevented from being given to the passenger as described above, and mild and comfortable air-conditioning feeling can be given to the passenger more effectively.

(Second Embodiment)

Figure 5:
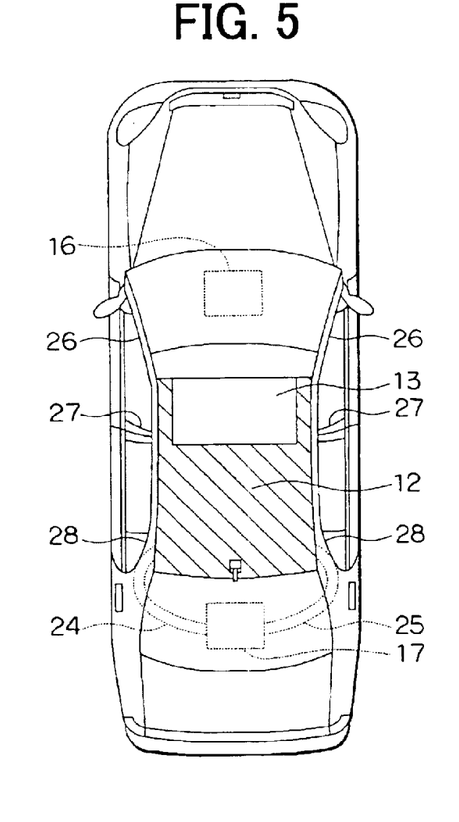
FIG. 5 is a schematic top view showing a vehicle having a ceiling air passage system according to a second embodiment of the present invention.

In the above-described first embodiment, the air passage (slant line area in FIG. 3) 12 is provided so as to enclose the entire periphery of the rectangular sunroof opening 13. However, in the second embodiment, as shown in FIG. 5, the air passage 12 is provided in a U-shape so as to enclose the three edges of the rectangular sunroof opening 13. Specifically, since the sunroof opening 13 is located at a front side of the ceiling portion in the vehicle front-rear direction, the air passage 12 is provided in the U-shape so as to enclose the rectangular sunroof opening 13 at two edges in the vehicle right-left direction and at one edge on the vehicle rear side. In the second embodiment, the other parts are similar to those of the above-described first embodiment, and the advantages similar to the above-described first embodiment can be obtained.

(Third Embodiment)

Figure 6:
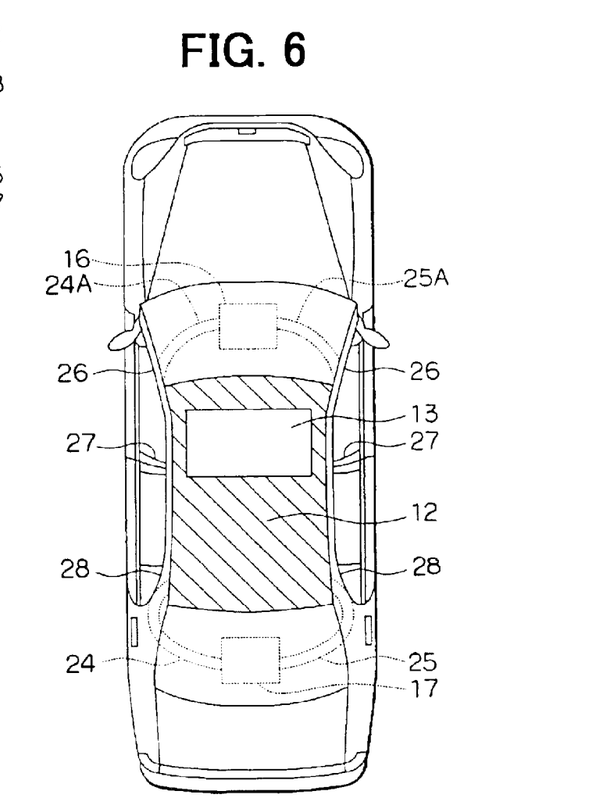
FIG. 6 is a schematic top view showing a vehicle having a ceiling air passage system according to a third embodiment of the present invention.

In the above-described first and second embodiments, conditioned air is blown from only the air outlet portion of the rear air conditioning unit 17 into the air passage 12 through the right and left air ducts 25, 24. However, in the third embodiment, as shown in FIG. 6, right and left air ducts 25A, 24A communicating with the air passage 12 are provided to be connected to an air outlet portion of the front air conditioning unit 16. The right and left air ducts 25A, 24A are disposed in the A pillars 26 that are located at the most front side among the A pillars 26, the B pillars 27 and the C pillars 28. The right and left air ducts 25A, 24A extend upward to the ceiling portion, so that top ends of the right and left air ducts 25A, 24A are connected to the right and left ends of the air passage 12 in the ceiling portion on the vehicle front side.

In the third embodiment, since the conditioned air can be blown into the air passage 12 from both of the front and rear air conditioning units 16, 17, an air blowing speed from the air outlets 15 can be effectively uniformed in the vehicle front-rear direction of the air passage 12.

(Fourth Embodiment)

Figure 7:
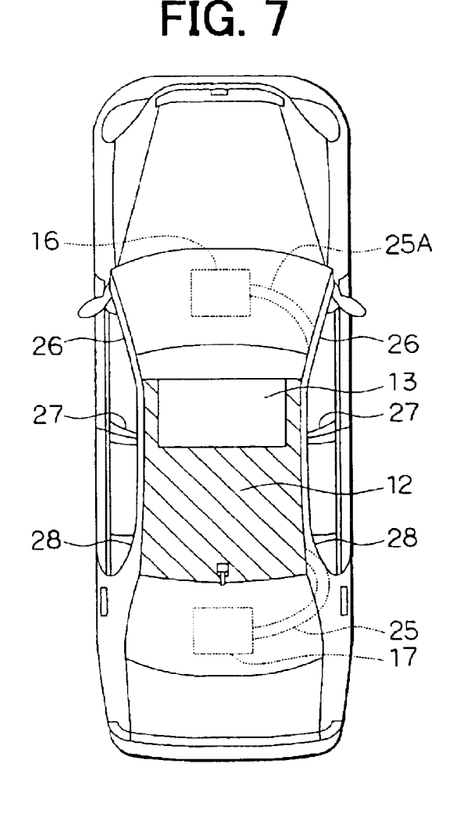
FIG. 7 is a schematic top view showing a vehicle having a ceiling air passage system according to a fourth embodiment of the present invention.

In the first to third embodiments, the right and left air ducts 25, 24 are connected to the rear air conditioning unit 17. Further, in the above-described third embodiment, the right and left air ducts 25A, 24A are also connected to the front air conditioning unit 16. However, in the fourth embodiment, as shown in FIG. 7, one of the right and left air ducts 25, 24 is connected to the rear air conditioning unit 17, and one of the right and left air ducts 25A, 24A is connected to the front air conditioning unit 16. For example, only the right air duct 25 is connected to the rear air conditioning unit 17, and only the right air duct 25A is connected to the front air conditioning unit 16. In this case, the conditioned air is blown into the air passage 12 through only the right air ducts 25, 25A from both of the front and rear sides. In the fourth embodiment, the operational effect as in the third embodiment can be obtained.

Further, only one of the right and left air ducts 25, 24 may be connected to the rear air conditioning unit 17 in the first and second embodiments. Even in this case, the conditioned air can be blown into the air passage 12 from one end of the right and left ends.

(Fifth Embodiment)

Figure 8:
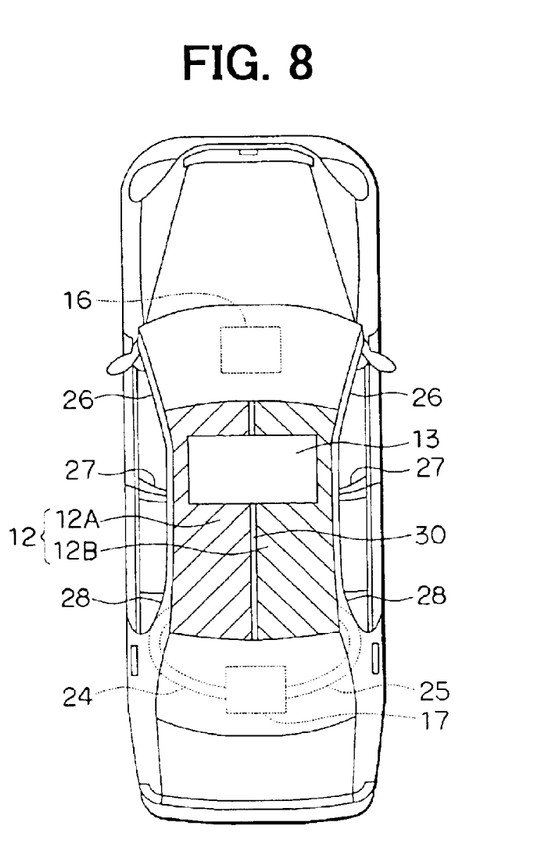
FIG. 8 is a schematic top view showing a vehicle having a ceiling air passage system according to a fifth embodiment of the present invention.

In the fifth embodiment, as shown in FIG. 8, a partition portion 30 extending in the vehicle front-rear direction is disposed in the air passage at a center in the vehicle right-left direction, thereby partitioning the air passage 12 into right and left passage areas 12B, 12A. In this case, the conditioned air is blown from the right and left air outlets of the rear air conditioning unit 17 into the right and left passage areas 12B, 12A through the right and left air ducts 25, 24 in independent from each other. In the fifth embodiment, a right-left independent temperature adjusting mechanism is provided in the rear air conditioning unit 17, so that a temperature of conditioned air to be blown from the air outlets 15 in the right passage area 12B of the air passage 12 and a temperature of conditioned air to be blown from the air outlets 15 in the left passage area 12A can be independently adjusted.

The rear air conditioning unit 17 can include an air amount adjusting door capable of independently adjusting air amounts distributed into the right and left air ducts 25, 24. In this case, air blowing amounts from the right and left passage areas 12B, 12A can be independently controlled. The rear air conditioning unit 17 can include right and left electric blowers for independently blowing conditioned air into the right and left air ducts 25, 24, respectively. In this case, the rotational speeds of the right and left electric blowers are independently controlled, thereby independently controlling the air amounts blown into the right and left air ducts 25, 24. Accordingly, in the fifth embodiment, independent air-conditioning control at the vehicle right and left sides can be realized in accordance with thermal loads and passenger's preferences on the right and left passenger seats. Further, the independent air-conditioning control at the vehicle right and left sides may be performed not by the rear air conditioning unit 17 but by the front air conditioning unit 16.

(Sixth Embodiment)

Figure 9:
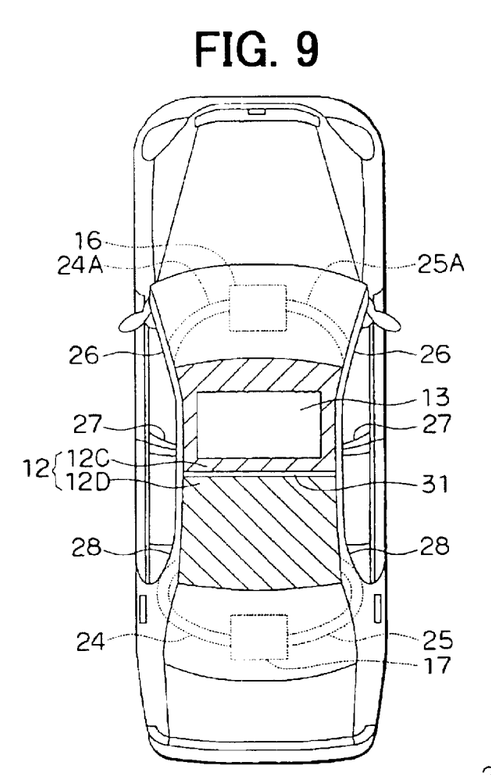
FIG. 9 is a schematic top view showing a vehicle having a ceiling air passage system according to a sixth embodiment of the present invention.

In the sixth embodiment, as shown in FIG. 9, a partition portion 31 extending in the vehicle right-left direction is disposed in the air passage 12 at an approximate center in the vehicle front-rear direction, thereby partitioning the air passage 12 into front and rear passage areas 12C, 12D. In the sixth embodiment, the right and left air ducts 25, 24 are provided so that conditioned air is blown from the right and left air outlets of the front air conditioning unit 16 into the front passage area 12C of the air passage 12 through the right and left air ducts 25, 24. Further, the right and left air ducts 25A, 24A are provided so that conditioned air is blown from the right and left air outlets of the rear air conditioning unit 17 into the rear passage area 12D of the air passage 12 through the right and left air ducts 25A, 24A. In this way, the conditioned air can be independently blown from the front and rear air conditioning units 16, 17 into the front and rear passage areas 12C, 12D of the air passage 12, respectively. In the sixth embodiment, the temperature adjusting mechanisms of the front and rear air conditioning units 16, 17 can be independently operated. In this case, an air temperature blown from the air outlets 15 into the front passage area 12C of the air passage 12 and an air temperature blown from the air outlets 15 into the rear passage area 12D of the air passage 12 can be independently adjusted.

Further, the rotational speeds of the blowers of the front and rear air conditioning units 16, 17 can be independently adjusted. In this case, an air blowing amount from the front passage area 12C of the air passage 12 and an air blowing amount from the rear passage area 12D of the air passage 12 can be independently adjusted. Accordingly, in the sixth embodiment, independent air-conditioning control on the vehicle front and rear sides of the passenger compartment can be realized in accordance with thermal loads and passenger's preferences on the front and rear passenger seats.

(Seventh Embodiment)

Figure 10:
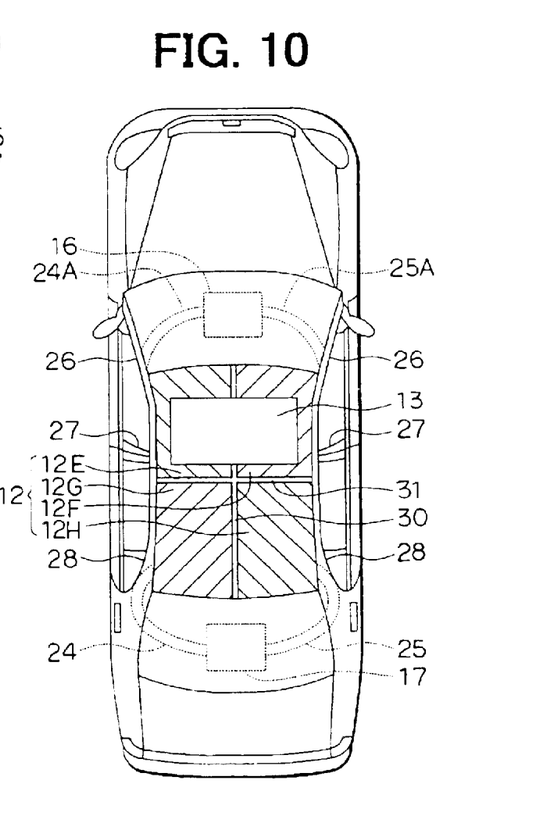
FIG. 10 is a schematic top view showing a vehicle having a ceiling air passage system according to a seventh embodiment of the present invention.

In the seventh embodiment, as shown in FIG. 10, the partition portion 30 in the fifth embodiment and the partition portion 31 in the sixth embodiment are combined together. That is, the air passage 12 is partitioned by the partition portions 30, 31 in a cross shape, into front left, front right, rear left and rear right passage areas 12E, 12F, 12G, 12H. In this case, conditioned air from the right and left air outlets of the front air conditioning unit 16 can be independently blown into the front right and front left passage areas 12F, 12E through the right and left air ducts 25A, 24A. Further, conditioned air from the right and left air outlets of the rear air conditioning unit 17 can be independently blown into the rear right and rear left passage areas 12H, 12G through the right and left air ducts 25, 24.

Here, each of the front and rear air conditioning units 16, 17 can include a right-left independent temperature adjusting mechanism. In this case, air temperatures to be blown from the air outlets 15 in the front left, front right, rear left and rear right passage areas 12E, 12F, 12G, 12H are independently adjusted. Further, each of the front and rear air conditioning units 16, 17 can include the air amount adjusting door and the right-left independent electric blower described in the fifth embodiment. In this case, the air amounts blown into the passage areas 12E–12H are independently adjusted. Accordingly, in the seventh embodiment, independent air-conditioning control at the vehicle right and left sides and the vehicle front and rear sides can be accurately realized in accordance with thermal loads and passenger's preferences on the front, rear, right and left passenger seats.

Next, the independent air-conditioning control at the vehicle right and left sides in the fifth embodiment, the independent air-conditioning control at the vehicle front and rear sides in the sixth embodiment and the independent air-conditioning control at the vehicle right and left sides and the vehicle front and rear sides in the seventh embodiment will be described with reference to specific control examples. A solar radiation detecting unit including two solar radiation sensors, capable of detecting solar radiation amounts at the vehicle right and left sides, is provided on an upper portion of the dashboard 18. In this case, the air temperatures blown from the right and left passage areas 12B, 12A and the air blowing amounts blown from the right and left passage areas 12B, 12A can be independently controlled in accordance with the solar radiation amounts at the vehicle right and left sides.

Thus, the temperature of air blown toward an area (high cooling-load area), to which solar radiation is radiated, is reduced, or the amount of air blown into the high cooling-load area can be increased. Therefore, the cooling feeling can be restricted from being worsened by heat radiated from a vehicle wall portion to which solar radiation is radiated. At this time, the rotational speed of the electric blower can be controlled to be reduced in an area (low cooling-load area) to which solar radiation is not radiated, thereby automatically saving power consumption of the electric blower.

Further, the air temperatures to be blown into the vehicle front and rear areas of the passenger compartment can be independently controlled by detecting the solar radiation amounts radiated to the vehicle front and rear areas of the passenger compartment. A matrix-type infrared rays sensor disclosed in JP-A-11-201822 may be used in place of the solar radiation detecting unit including two solar radiation sensors, for detecting solar radiation amounts at the vehicle right and left sides. In this case, the air-conditioning control can be independently performed at the vehicle right and left areas of the passenger compartment and the vehicle front and rear areas of the passenger compartment by using the matrix-type infrared rays sensor.

Here, the matrix-type infrared rays sensor includes plural infrared-rays detecting elements arranged in a matrix shape, and detects a temperature distribution in a predetermined detection area set in the passenger compartment. Preferably, the matrix-type infrared rays sensor is disposed around a rearview mirror 33 located at an upper side of a windshield 32 in the passenger compartment. The matrix-type infrared rays sensor can detect a solar radiation amount difference between the vehicle right and left sides and a sunlight amount difference between the vehicle front and rear sides. Therefore, the air-conditioning control can be independently performed at the vehicle right and left sides and the vehicle front and rear sides based on detection values output from the single matrix-type infrared rays sensor.

The matrix-type infrared rays senor can detect the presence or absence of a passenger on each of the passenger seats 19, 20, 22, 23. Therefore, the air-conditioning control can be effectively performed so that a necessary minimized air-conditioning capacity is supplied to a passenger seat area with the passenger's presence in accordance with air-conditioning thermal loads around the passenger seat, without respect to solar radiation. Here, the necessary minimized air-conditioning capacity is determined by an air blowing temperature and an air blowing amount. As a result, consumed power in air-conditioning can be further saved.

(Eighth Embodiment)

Figure 11:
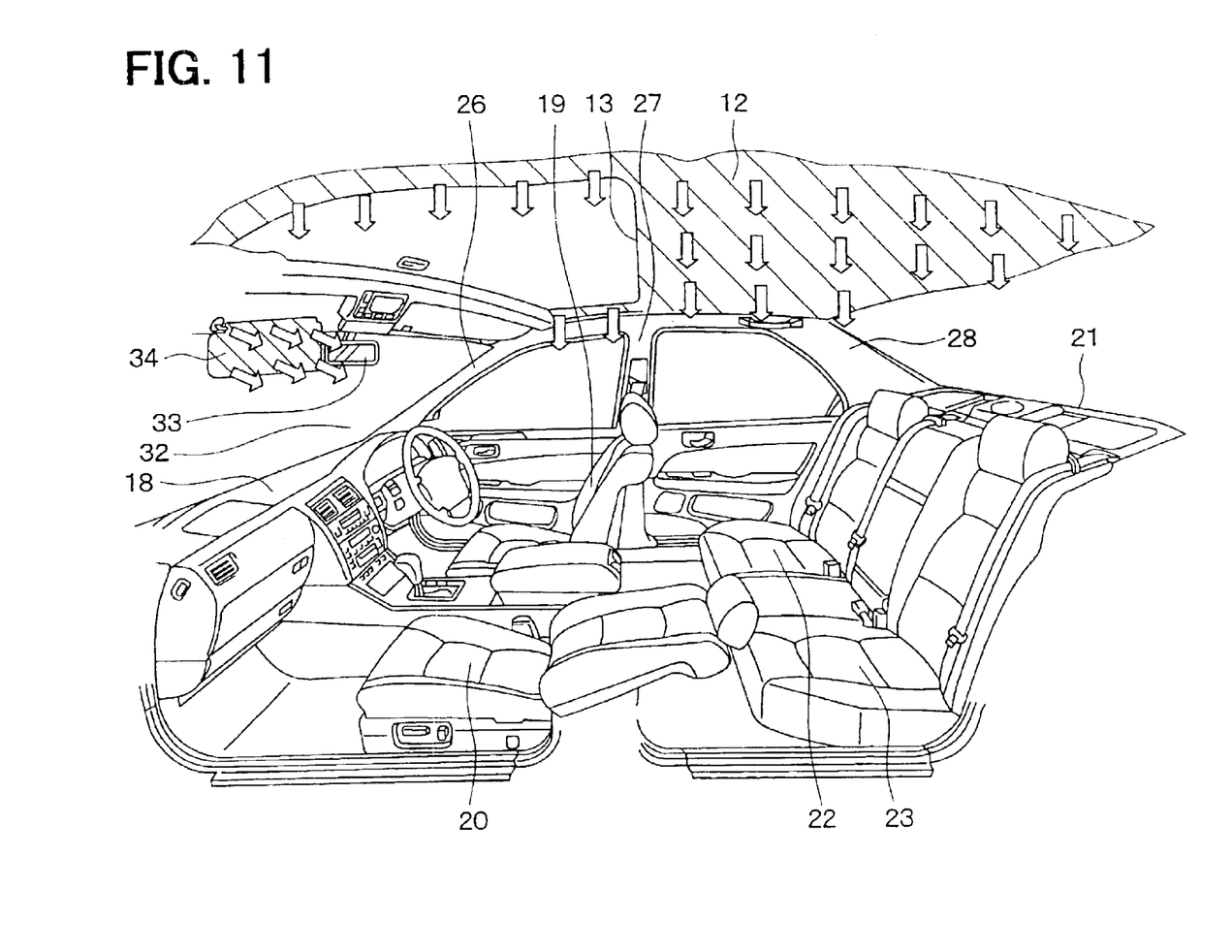
FIG. 11 is a perspective view showing a passenger compartment of a vehicle for which a ceiling air passage system according to an eighth embodiment of the present invention is used.

In the eighth embodiment of the present invention, as shown in FIG. 11, a sun visor 34 located at an upper side of the windshield 32 in the passenger compartment is used as one ceiling air outlet surface. In FIG. 11, the sun visor 34 is moved to a solar radiation shield position. Air outlets, corresponding to the air outlets 15 of the air passage 12, are provided on the surface (slant line surface in FIG. 11) of the sun visor 34 facing the rear side in the passenger compartment, and an air passage is provided in the sun visor 34. The air passage in the sun visor 34 communicates with an auxiliary air duct branched from the air ducts 24A, 25A disposed in the A pillars 26, or the auxiliary air duct branched from the air passage 12.

Accordingly, a part of conditioned air can be introduced into the air passage in the sun visor 34, and can be blown from the air outlets of the sun visor 34 from the most front side to the rear side in the passenger compartment. At this time, since a location angle of the sun visor 34 can be freely adjusted, an air blowing direction from the air outlets of the sun visor 34 can be readily adjusted by adjusting the location angle of the sun visor 34.

(Ninth Embodiment)

Figure 12:
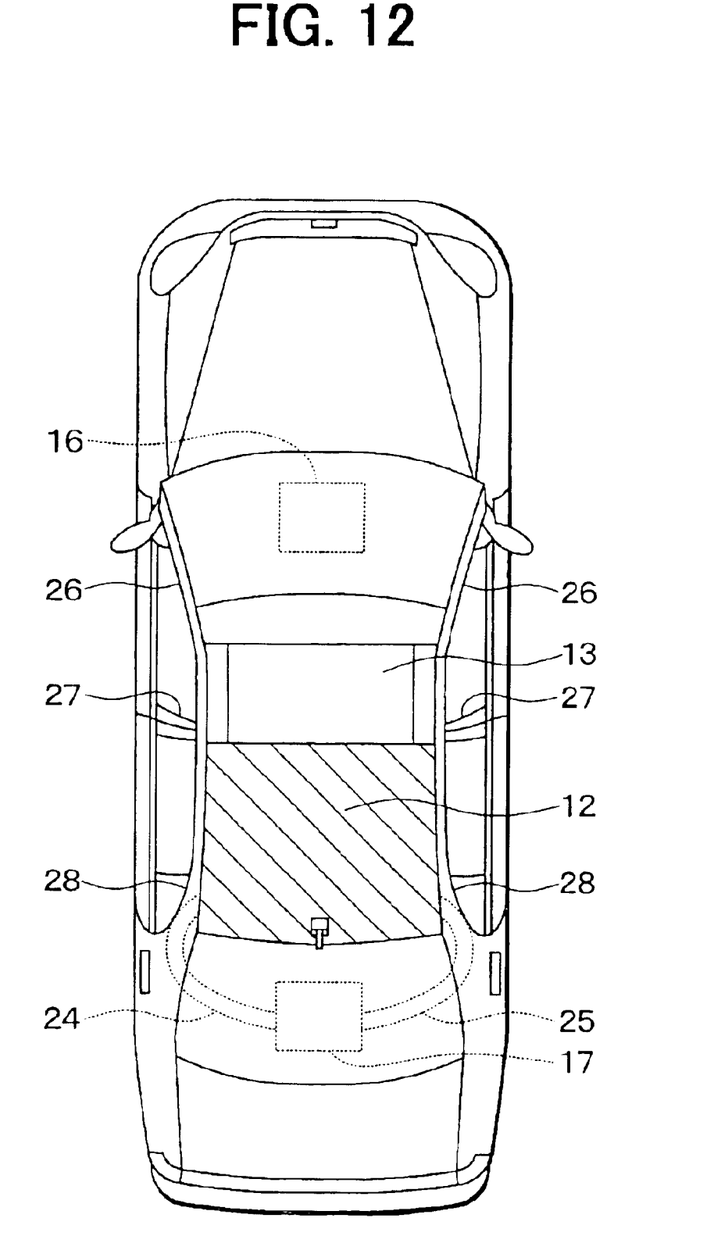
FIG. 12 is a schematic top view showing a vehicle having a ceiling air passage system according to a ninth embodiment of the present invention.

The ninth embodiment is a modification of the above-described second embodiment. Specifically, in the ninth embodiment, as shown in FIG. 12, the sunroof opening 13 is located in the ceiling portion at the front end. Further, the air passage 12 is provided at the vehicle rear side of the sunroof opening 13 in a rectangular shape, thereby simplifying the shape of the air passage 12. In the ninth embodiment, the other parts are similar to those of the above-described first embodiment.

(Other Embodiments)

Although the present invention has been fully described in connection with the preferred embodiments thereof with reference to the accompanying drawings, it is to be noted that various changes and modifications will become apparent to those skilled in the art.

For example, in the above-described embodiments of the present invention, the air passage 12 is provided directly around the sunroof opening 13. However, actually, a sunroof opening-closing mechanism is disposed in the ceiling portion in the passenger compartment to open and close the sunroof opening 13. The sunroof opening-closing mechanism is constructed to be slidable on the sunroof opening 13 in the vehicle front-rear direction. For example, when the sunroof opening-closing mechanism slides to the vehicle rear side on the sunroof opening 13, the sunroof opening 13 is opened. In this case, when the sunroof opening 13 is opened, the sunroof opening-closing mechanism is positioned on the ceiling portion at the rear side of the sunroof opening 13. Therefore, the air passage 12 may be provided so as to enclose an entire periphery of both of the sunroof opening 13 and a sliding area of the sunroof opening-closing mechanism, or in a U-shape. Further, as in the ninth embodiment, the air passage 12 may be provided in a rectangular shape at the vehicle rear side of the sunroof opening 13 and the sliding area of the sunroof opening-closing mechanism.

Such changes and modifications are to be understood as being within the scope of the present invention as defined by the appended claims.

What is claimed is:

1. A ceiling air passage system for a vehicle air conditioner having an air conditioning unit for adjusting conditioned air to be blown into a passenger compartment of a vehicle, the ceiling air passage system comprising a passage member for defining an air passage into which conditioned air from the air conditioning unit is introduced, the air passage being provided along a surface of a vehicle ceiling portion; and a three-dimension structure member having a three-dimensional passage shape, the three-dimension structure member being disposed in the air passage, wherein the passage member for defining a lower part of the air passage is provided with a plurality of air outlets from which the conditioned air in the air passage is blown downward in the passenger compartment; wherein the air passage is provided to enclose an entire periphery of a rectangular sunroof opening of the vehicle.

2. The ceiling air passage system according to claim 1, wherein the three-dimension structure member is constructed with a net structure of a fiber member.

3. The ceiling air passage system according to claim 1, wherein the air conditioning unit is disposed at least at one of vehicle front and rear sides in the passenger compartment, the ceiling air passage system further comprising an air duct through which the air passage is connected to an air outlet portion of the air conditioning unit, the air duct being arranged in a vehicle pillar.

4. The ceiling air passage system according to claim 1, further comprising a partition member for partitioning the air passage into a right passage area and a left passage area in a vehicle right-left direction, wherein the right passage area and the left passage area are connected to the air conditioning unit such that the conditioned air from the air conditioning unit is independently blown into the right and left passage areas of the air passage.

5. The ceiling air passage system according to claim 4, wherein:

the air conditioning unit includes at least an electric blower for blowing air, a heat exchanger for performing a heat exchange of air blown by the electric blower, and a right-left independent temperature adjusting mechanism for independently adjusting temperature of air to be blown from the air conditioning unit into the right passage area and temperature of air blown from the air conditioning unit into the left passage area; and the air passage is provided such that the temperature of air blown from the air outlets in the right passage area and the temperature of air blown from the air outlets in the left passage area are independently adjusted.

6. The ceiling air passage system according to claim 4, further comprising right and left air ducts connected to an air outlet portion of the air conditioning unit, through which the conditioned air from the air outlet portion of the air conditioning unit is introduced into the right and left passage areas, the right and left air ducts being arranged in right and left vehicle pillars adjacent to right and left side windows, respectively.

7. The ceiling air passage system according to claim 1, further comprising a partition member for partitioning the air passage into a front passage area and a rear passage area in a vehicle front-rear direction, wherein the front passage area and the rear passage area are connected to the air conditioning unit such that the conditioned air from the air conditioning unit is independently blown into the front and rear passage areas of the air passage.

8. The ceiling air passage system according to claim 7, wherein the air conditioning unit includes front and rear air-conditioning portions disposed at vehicle front and rear sides in the passenger compartment, respectively, the ceiling air passage system further comprising:

a front right air duct and a front left air duct connected to an air outlet portion of the front air-conditioning portion, through which the conditioned air from the front air-conditioning portion is introduced into the front passage area, the front right air duct and the front left air duct being arranged at the vehicle right and left sides; and a rear right air duct and a rear left air duct connected to an air outlet portion of the rear air-conditioning portion, through which the conditioned air from the rear air-conditioning portion is introduced into the rear passage area, the rear right air duct and the rear left air duct being arranged at the vehicle right and left sides on a rear side of the front right and left air ducts.

9. The ceiling air passage system according to claim 7, wherein the air conditioning unit includes front and rear air-conditioning portions disposed at vehicle front and rear sides in the passenger compartment, respectively, the ceiling air passage system further comprising:

a front air duct connected to an air outlet portion of the front air-conditioning portion, through which conditioned air from the front air-conditioning portion is introduced into the front passage area; and a rear air duct connected to an air outlet portion of the rear air-conditioning portion, through which conditioned air from the rear air-conditioning portion is introduced into the rear passage area, the rear air duct being arranged at a vehicle rear side of the front air duct.

10. The ceiling air passage system according to claim 1, further comprising a partition member for partitioning the air passage into a front right passage area, a front left passage area, a rear right passage area and a rear left passage area, in a vehicle right-left direction and a vehicle front-rear direction, wherein the air passage is connected to the air conditioning unit such that the conditioned air from the air conditioning unit is independently blown into the passage areas of the air passage, respectively.

11. The ceiling air passage system according to claim 1, wherein:

the passage member for defining the air passage includes a heat insulating member disposed at a back side of a vehicle roof, and a ceiling base member disposed at a lower side of the heat insulating member to have a predetermined distance between the heat insulating member and the ceiling base member;

the air passage is provided in a flat space between the heat insulating member and the ceiling base member;

the three-dimension structure member is arranged substantially in an entire area of the flat space, and is constructed with a net structure of a fiber member made of a synthetic resin; and the plurality of air outlets are provided substantially in an entire area of the ceiling base member.

12. The ceiling air passage system according to claim 11, wherein the three-dimension structure member is fixed to the ceiling base member by using one of an adhesive and a mechanical fixing member.

13. A vehicle ceiling structure for an air conditioner having an air conditioning unit for adjusting a state of conditioned air to be blown into a passenger compartment of a vehicle, the ceiling structure comprising a ceiling portion;

a rectangular sunroof opening provided in the ceiling portion;

a passage member for defining an air passage into which conditioned air from the air conditioning unit is introduced, the air passage being provided along a surface of the ceiling portion; and a three-dimension structure member having a three-dimensional passage shape, the three-dimension structure member being disposed in the air passage, wherein:

the passage member for defining a lower part of the air passage is provided with a plurality of air outlets from which the conditioned air in the air passage is blown downward in the passenger compartment; and the plurality of air outlets are provided around the rectangular sunroof opening.

14. The vehicle ceiling structure according to claim 13, wherein the air passage is provided to enclose an entire periphery of the rectangular sunroof opening.

15. The vehicle ceiling structure according to claim 13, wherein the air passage is provided to enclose three edges of the rectangular sunroof opening.

16. The vehicle ceiling structure according to claim 13, the air passage is provided substantially in a rectangular shape at a vehicle rear side of the rectangular sunroof opening.

17. A ceiling passage system for a vehicle air conditioner having an air conditioning unit for adjusting conditioned air to be blown into a passenger compartment of a vehicle, the ceiling air passage system comprising a passage member for defining an air passage into which conditioned air from the air conditioning unit is introduced, the air passage being provided along a surface of a vehicle ceiling portion; and a three-dimension structure member having a three-dimensional passage shape, the three-dimension structure member being disposed in the air passage, wherein the passage member for defining a lower part of the air passage is provided with a plurality of air outlets from which the conditioned air in the air passage is blown downward in the passenger compartment; wherein the three-dimension structure member is constructed with a net structure of a fiber member.

18. A ceiling passage system for a vehicle air conditioner having an air conditioning unit for adjusting conditioned air to be blown into a passenger compartment of a vehicle, the ceiling air passage system comprising a passage member for defining an air passage into which conditioned air from the air conditioning unit is introduced, the air passage being provided along a surface of a vehicle ceiling portion; and a three-dimension structure member having a three-dimensional passage shape, the three-dimension structure member being disposed in the air passage, wherein the passage member for defining a lower part of the air passage is provided with a plurality of air outlets from which the conditioned air in the air passage is blown downward in the passenger compartment; wherein the passage member for defining the air passage includes a heat insulating member disposed at a back side of a vehicle roof, and a ceiling base member disposed at a lower side of the heat insulating member to have a predetermined distance between the heat insulating member and the ceiling base member;

the air passage is provided in a flat space between the heat insulating member and the ceiling base member;

the three-dimension structure member is arranged substantially in an entire area of the flat space, and is constructed with a net structure of a fiber member made of a synthetic resin; and the plurality of air outlets are provided substantially in an entire area of the ceiling base member.

19. The ceiling air passage system according to claim 18, wherein the three-dimension structure member is fixed to the ceiling base member by using one of an adhesive and a mechanical fixing member.

* * * * *